W. LANCASTER.
CORN TOPPING MACHINE.
APPLICATION FILED MAR. 31, 1913.

1,128,464.

Patented Feb. 16, 1915.
3 SHEETS—SHEET 2.

Witnesses
Robert M. Sutphen.
A. J. Hind.

Inventor
W. LANCASTER

By Watson E. Coleman
Attorney

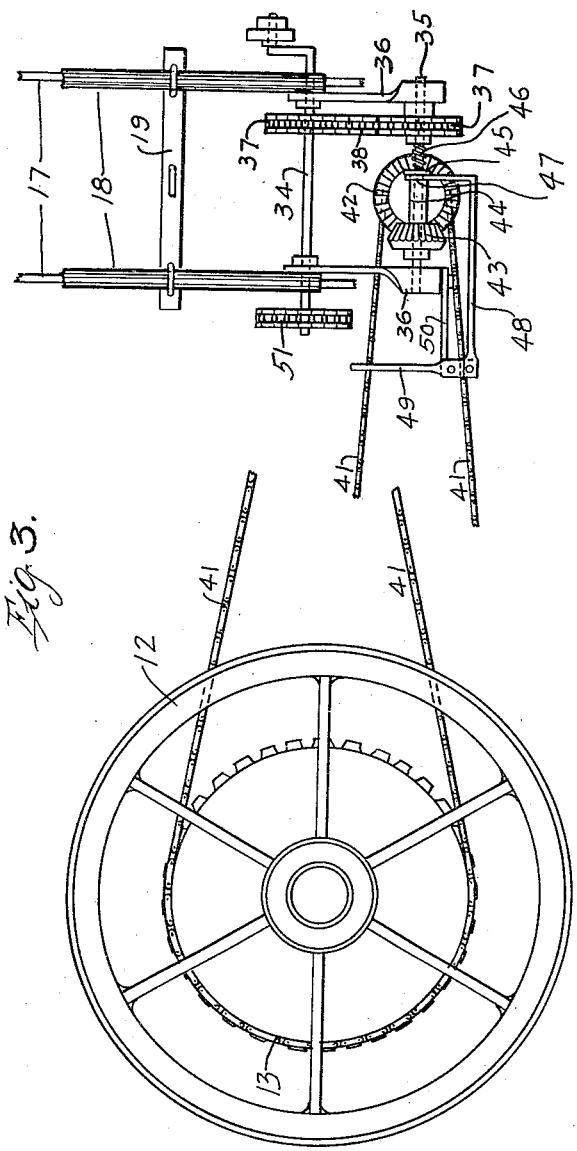
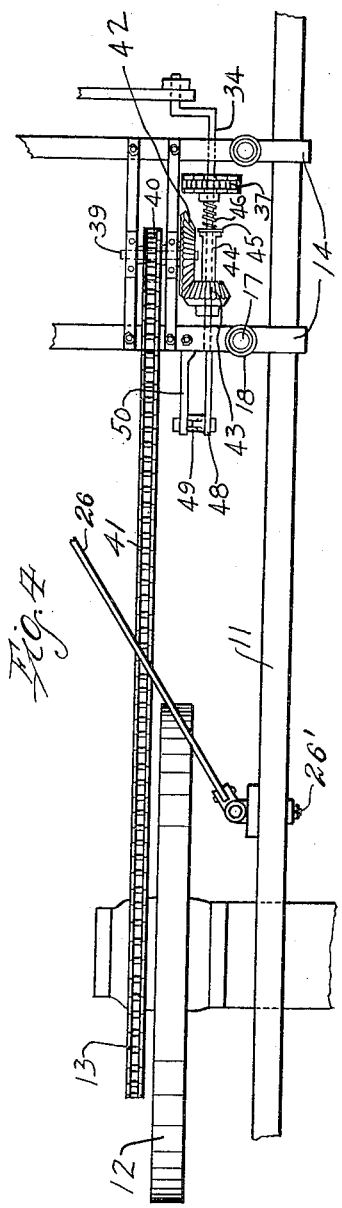

UNITED STATES PATENT OFFICE.

WALTER LANCASTER, OF ALVA, OKLAHOMA.

CORN-TOPPING MACHINE.

1,128,464. Specification of Letters Patent. Patented Feb. 16, 1915.

Application filed March 31, 1913. Serial No. 757,930.

*To all whom it may concern:*

Be it known that I, WALTER LANCASTER, a citizen of the United States, residing at Alva, in the county of Woods and State of Oklahoma, have invented certain new and useful Improvements in Corn-Topping Machines, of which the following is a specification, reference being had to the accompanying drawings.

This invention relates to new and useful improvements in corn topping machines and more particularly to that class designed especially for the purpose of topping Kafir corn.

An object of this invention is the provision in a Kafir corn topper, of novel means for adjustably supporting the rotary wheel.

Another object of this invention is the provision of means whereby the topper can be removably attached to a wagon or the like and adjustably supported thereon.

A further object of the invention is the provision of means whereby the topper can be operatively connected to and driven by one of the wheels of the conveyance to which the said topper is attached.

A still further object of this invention is to improve and simplify machinery of this character, rendering it comparatively simple and inexpensive to manufacture, reliable and efficient in use, and readily operated.

With the above and other objects in view, this invention resides in the novel features of construction, formations, combinations and arrangements of parts to be hereinafter more fully described, claimed and illustrated in the accompanying drawings, in which—

Figure 1:
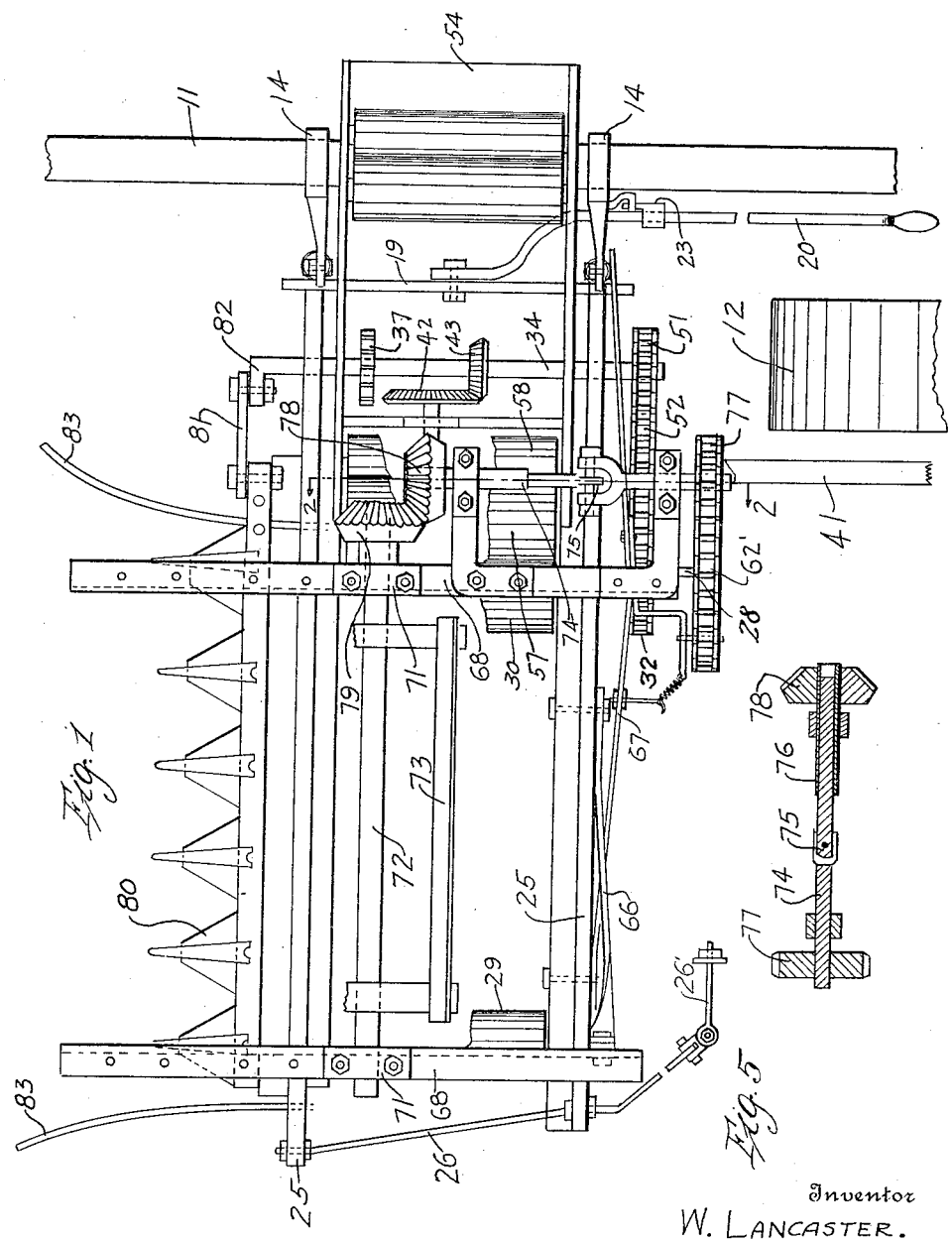
Figures 2, 6:
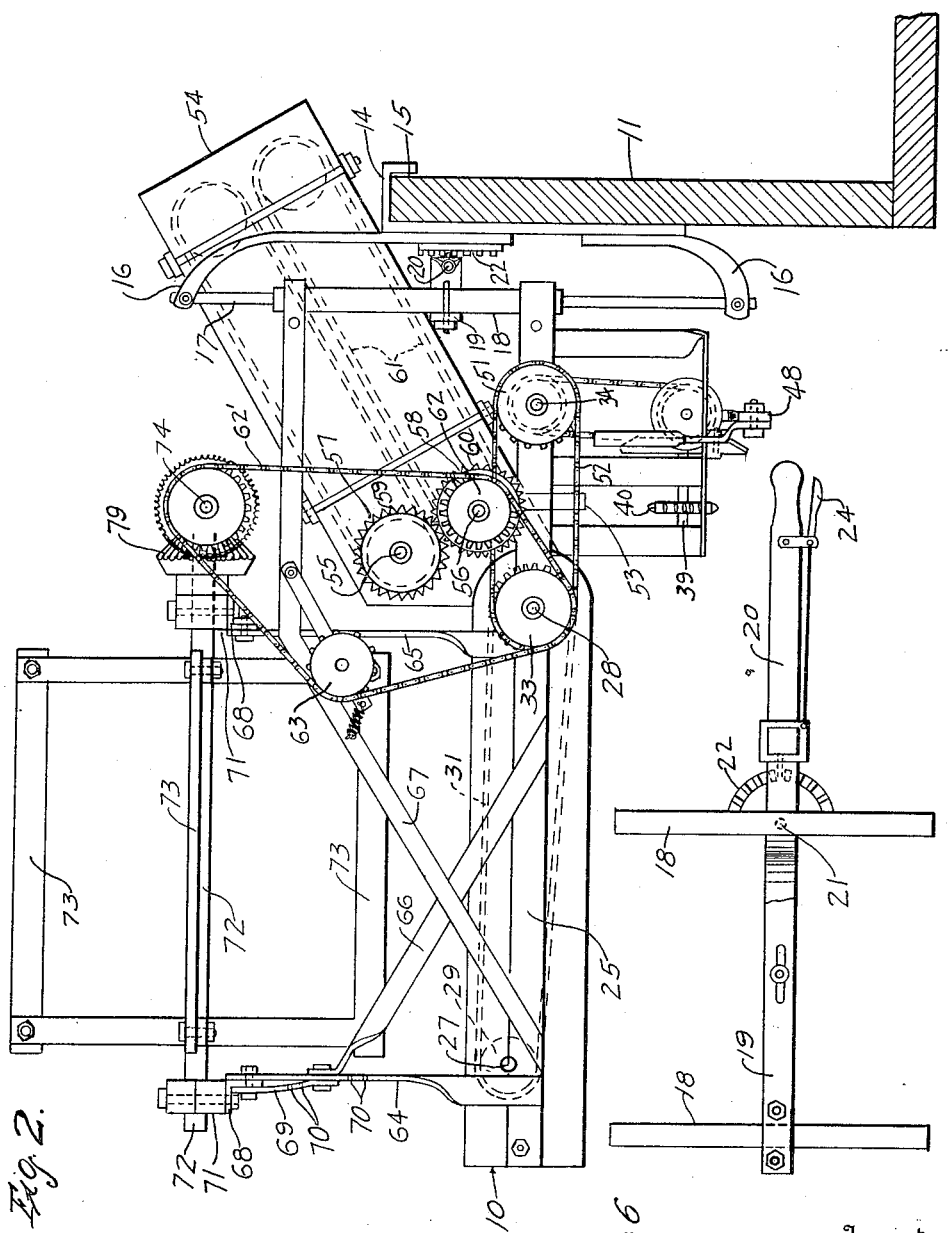

Figure 1 is a top plan view of my invention; Fig. 2 is an end view thereof; Fig. 3 is a detail side view illustrating the driving connection between the drive shaft and wheel; Fig. 4 is a detail plan view thereof; Fig. 5 is a longitudinal sectional view taken through the telescoping shaft on the line 5—5 of Fig. 1. Fig. 6 is a detail elevational view of the corn topper raising and lowering lever.

Referring to the accompanying drawings by similar characters of reference throughout the several views, the numeral 10 designates generally my improved corn topper, which is attached to one side of a wagon body 11, the latter being mounted upon the usual wheels 12, one of which, and preferably one of the rear wheels, has secured thereto a sprocket wheel 13.

Brackets 14 are removably attached, as at 15, to one of the sides of a wagon, and as shown in the drawings, the left side thereof. These brackets 14 are formed with outwardly curved terminals 16, which are connected by supporting rods 17, the latter being disposed in parallel relation to the said brackets 14.

Supporting sleeves 18 are slidably located upon the rods 17, and adjustably support the topper 10. A bar 19 connects the sleeves 18 and has pivoted thereto an adjusting lever 20, which is also pivotally connected, as at 21, to the wagon body 11. A segment 22 is secured to one of the brackets 14, and is arranged for engagement with a locking pawl 23 carried by the lever 20, and operated by means of the hand grip 24. Obviously, upon the raising or lowering of this lever 20, the sleeves 18 will be raised and lowered upon the rods 17, as desired, and locked in their adjusted positions by means of the pawl 23. The adjustment of these sleeves 18 upon the rods 17 raises and lowers the topper 10 to the desired position relative to the wagon body 11, which will obviously top the corn at the desired height.

The topper 10 consists of a pair of opposite front and rear bars 25, which are connected at their inner ends rigidly to the sleeves 18. These front and rear bars 25 are connected at their outer ends by a longitudinal bar 26, while journaled between these bars are shafts 27 and 28, which have keyed thereto rollers 29 and 30, over which passes a conveyer apron 31.

Preferably, the brace rod 26 is extended rearwardly, as best illustrated in Fig. 1 and is connected by a knuckle joint to a bolt 26' designed to be secured to a standard on the wagon, whereby the apparatus will be held in place and may be raised or lowered, as required.

The shaft 28 carries keyed thereon sprocket wheels 32 and 33. A shaft 34 is journaled in bearings disposed at the extreme inner ends of the side bars 25, while disposed below this shaft is a similar shaft 35, journaled in hangers 36 which depend from the side bars 25 beneath the shaft 34.

Sprocket wheels 37 are keyed to the shafts 34 and 35 and are connected by a sprocket chain 38. A transverse shaft 39 is journaled in the before described hangers 36 and extends at right angles to the shaft 35, in substantially the same horizontal plane. A sprocket wheel 40 is keyed to this transverse shaft and is connected by a chain 41 to the sprocket wheel 13, previously mentioned as being secured to one of the wheels 12. It is to be understood that the chain 41 possesses sufficient slack as to permit the adjustment of the topper 10 longitudinally of the supporting rods 17. A beveled gear 42 is keyed to the inner end of the shaft 39 and meshes with a beveled gear 43 keyed to a sleeve 44, which is slidably located upon the said shaft 35. This sleeve is formed at one end with a flange 45, for engagement with a spring 46 which contacts at its opposite end with the lower sprocket wheel 37, and serves to normally retain the beveled gears 42 and 43 out of mesh. The sleeve 44 is slidingly splined to the shaft 35 and receives a collar 47 arranged to bear against the flange 46. This collar has formed thereon an integral link 48, which is pivotally attached to a lever 49 fulcrumed upon a bracket 50, which is attached to the hanger 36.

Obviously, upon the operation of the lever 49, the beveled gears 42 and 43 will be thrown into and out of engagement. The shaft 34 has keyed to one end thereof a sprocket wheel 51, which is connected by a chain 52 to the previously described sprocket wheel 32, thereby serving to impart a rotary movement to the shaft 28, which supports this said sprocket wheel. The chain 52 is engaged by a belt tightener 53, by means of which any slack in the said chain can be taken up, as desired.

An upwardly inclined conveyer frame 54 is mounted between the front and rear members 25, and rests upon the bar 19 and by its contact with the opposite sides of the sleeves 18, it is held securely in position against displacement. Upper and lower shafts 55 and 56 are journaled in the side members of the conveyer frame 54 and have keyed thereon upper and lower rollers 57 and 58.

The shafts 55 and 56 at the lower end of the conveyer frame 54 are rotatably connected by intermeshing gear wheels 59 and 60, while passing over the rollers 57 and 58 are the upwardly inclined conveyer aprons 61, which extend above the adjacent side of the wagon body 11. A sprocket wheel 62 is keyed to the rear end of the shaft 56 disposed at the lower end of the conveyer frame 54 and engages a sprocket chain 62′, which passes over the before described sprocket wheel 33 providing a means whereby upon the rotation of the shaft 28, power will be applied to the conveyer aprons 61. This chain 62′ is engaged by a belt tightener 63, by means of which any unnecessary slack in the said chain can be taken up. A pair of vertical bars 64 and 65 are attached to the rear end bar 25 and are held rigid with respect thereto by braces 66 and 67, the latter of which extends upwardly to the rear sleeve 18 to which it is attached, thus producing a rigid structure.

Reel supporting bars 68 are pivoted at their inner ends to the upper extremities of the vertical bars 64 and 65 and have pivotally connected thereto links 69, each of which is provided with a series of openings 70 for the reception of suitable fastening devices, which engage the bars 64 and 65, thus providing a means for raising and lowering the forward ends of the reel supporting bars 68.

Bearings 71 are adjustably secured to the reel bars 68 and support a shaft 72 to which is secured the reel 73. A shaft 74 is journaled in the frame of the topper 10 and is provided adjacent its rear end with a knuckle 75 to permit of the swinging movement of the forward end thereof to conform to the position of the reel 73. This shaft 74 is also provided with a telescoping extension 76 to provide for the adjustment of the bearings 71 which carry the reel shaft 72.

A sprocket wheel 77 is keyed to the rear end of the shaft 74 and engages the previously described chain 62′, while secured to the forward end of this shaft 74 is a beveled gear 78, which meshes with a beveled gear 79 keyed to the inner end of the shaft 72.

Obviously, when rotary movement is applied to the shafts which operate the conveyers, a rotary movement will be likewise imparted to the shaft 72 and reel 73 supported thereby.

A sickle 80 is secured to the forward one of the bars 25 and is operated through the medium of a link 81 and crank arm 82, attached to the shaft 34.

A pair of guide rods 83 are attached to the forward bar 25 and are adapted to guide any of the leaning stalks of corn into the path of the said sickle 80.

The operation of the device is as follows:—The topper frame is first adjusted upon the side of the wagon body the desired height from the ground, and the wagon is then propelled through the field of standing Kafir corn. Obviously, upon the rotation of the wagon wheels, the sickle will be operated to sever the stalks the desired distance from the ground and these stalks will then be deposited upon the lower conveyer by the reel 73. The cut stalks will then be conveyed inwardly upon the lower conveyer until reaching the upper conveyer, from which they will be deposited into the wagon body previously described.

It should be understood in this connection that various minor changes in the specific details of construction can be resorted to within the scope of the appended claims without departing from or sacrificing any of the advantages of the invention.

It should be further understood in this connection that I am not to be limited to the machine for use only in topping Kafir corn, but may employ the same for any purpose to which the various parts thereof will adapt themselves.

From the foregoing description taken in connection with the accompanying drawings, it will be manifest that a topper for Kafir corn is provided which will fulfil all of the necessary requirements of such a device.

Having thus fully described this invention, what I claim as new and desire to protect by Letters Patent is:—

1. In combination with a supporting member, spaced brackets detachably engaged with the supporting member, each bracket having outwardly curved terminals in vertical alinement, rods connecting alined terminals, a sleeve slidably mounted upon each of the rods, a rigid member connecting the sleeves, a topper mechanism operatively supported by the sleeves, means for adjusting the sleeves longitudinally of the rods and a brace rod secured to the outer extremity of the topper mechanism and pivotally engaged with the supporting member.

2. In combination with a supporting member, spaced brackets detachably engaged with the supporting member, each bracket having outwardly curved terminals in vertical alinement, rods connecting alined terminals, a sleeve adjustably mounted upon each of the rods, a rigid member connecting the sleeves, a topper mechanism operatively supported by the sleeves, a substantially horizontal rock lever operatively engaged with the supporting member and in pivotal engagement with the rigid connecting member of the sleeves at a point substantially midway between the sleeves, said lever being capable of operation to adjust the sleeves longitudinally of the rods, and means for locking the lever in its varying adjustments.

3. In combination with a supporting member, spaced brackets detachably engaged with the supporting member, each bracket having outwardly curved terminals in vertical alinement, rods connecting alined terminals, a sleeve adjustably mounted upon each of the rods, a rigid member connecting the sleeves, a topper mechanism operatively supported by the sleeves, a rock lever operatively engaged with the supporting member in pivotal engagement with the rigid connecting member of the sleeves, said lever being capable of operation to adjust the sleeves longitudinally of the rods, and coacting means carried by the lever and a bracket for locking the lever in its varying adjustments, said lever being disposed longitudinally of the supporting member.

4. In combination with a supporting member, spaced brackets detachably engaged with the supporting member, each bracket having outwardly curved terminals in vertical alinement, rods connecting alined terminals, a sleeve slidably mounted upon each of the rods, a rigid member connecting the sleeves, a topper mechanism operatively supported by the sleeves, means for adjusting the sleeves longitudinally of the rods, a brace rod secured to the outer extremity of the topper mechanism and pivotally engaged with the supporting member, and an additional brace rod for the topper mechanism operatively engaged with one of the sleeves.

In testimony whereof I hereunto affix my signature in the presence of two witnesses.

WALTER LANCASTER.

Witnesses:
E. W. SNODDY,
C. H. MANNETTS.

Copies of this patent may be obtained for five cents each, by addressing the "Commissioner of Patents, Washington, D. C."